(12) United States Patent
Kim et al.

(10) Patent No.: US 8,223,194 B2
(45) Date of Patent: Jul. 17, 2012

(54) IMAGE PROCESSING METHOD AND APPARATUS

(75) Inventors: Yun-Tae Kim, Suwon-Si (KR); Heui-Keun Choh, Seoul (KR); Gee-Young Sung, Daegu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1134 days.

(21) Appl. No.: 11/979,735

(22) Filed: Nov. 7, 2007

(65) Prior Publication Data
US 2008/0180522 A1 Jul. 31, 2008

(30) Foreign Application Priority Data
Jan. 30, 2007 (KR) .................. 10-2007-0009597

(51) Int. Cl.
*H04N 7/18* (2006.01)
*G06F 12/00* (2006.01)
(52) U.S. Cl. ........................................... 348/50
(58) Field of Classification Search .............. 348/50, 348/113–118
See application file for complete search history.

(56) References Cited

U.S. PATENT DOCUMENTS

| | | | | |
|---|---|---|---|---|
| 5,953,054 A * | 9/1999 | Mercier | .......................... | 348/50 |
| 5,973,700 A * | 10/1999 | Taylor et al. | ................... | 345/427 |
| 6,128,071 A * | 10/2000 | Melen | .......................... | 356/4.05 |
| 7,616,885 B2 * | 11/2009 | Chen et al. | ..................... | 396/324 |
| 7,711,259 B2 * | 5/2010 | Daley | ............................. | 396/89 |
| 7,907,793 B1 * | 3/2011 | Sandrew | ....................... | 382/284 |
| 2002/0051006 A1 * | 5/2002 | Katagiri et al. | ............... | 345/653 |
| 2002/0110273 A1 * | 8/2002 | Dufour | ........................ | 382/154 |
| 2006/0055943 A1 * | 3/2006 | Kawasaki et al. | ............. | 356/606 |
| 2007/0024614 A1 * | 2/2007 | Tam et al. | ...................... | 345/419 |
| 2008/0031327 A1 * | 2/2008 | Wang et al. | .............. | 375/240.12 |
| 2009/0296984 A1 * | 12/2009 | Nijim et al. | ................... | 382/103 |

FOREIGN PATENT DOCUMENTS

| | | |
|---|---|---|
| JP | 5-314243 | 11/1993 |
| JP | 8-184432 | 7/1996 |
| JP | 2006-128995 | 5/2006 |
| JP | 2006-258486 | 9/2006 |
| KR | 10-2004-0018859 | 3/2004 |

OTHER PUBLICATIONS

Korean Office Action for corresponding Korean Patent Application No. 10-2007-0009597 dated Mar. 28, 2008, pp. 1-4.*

* cited by examiner

*Primary Examiner* — Zarni Maung
(74) *Attorney, Agent, or Firm* — Staas & Halsey LLP

(57) ABSTRACT

The present invention relates to an image processing method and apparatus. The image processing apparatus includes an image capturing unit generating a plurality of images at different visual points and a three-dimensional image processing unit extracting depth information using the plurality of images.

19 Claims, 9 Drawing Sheets

IMAGE CAPTURED AT FIRST VISUAL POINT

IMAGE CAPTURED AT SECOND VISUAL POINT

IMAGE CAPTURED AT THIRD VISUAL POINT

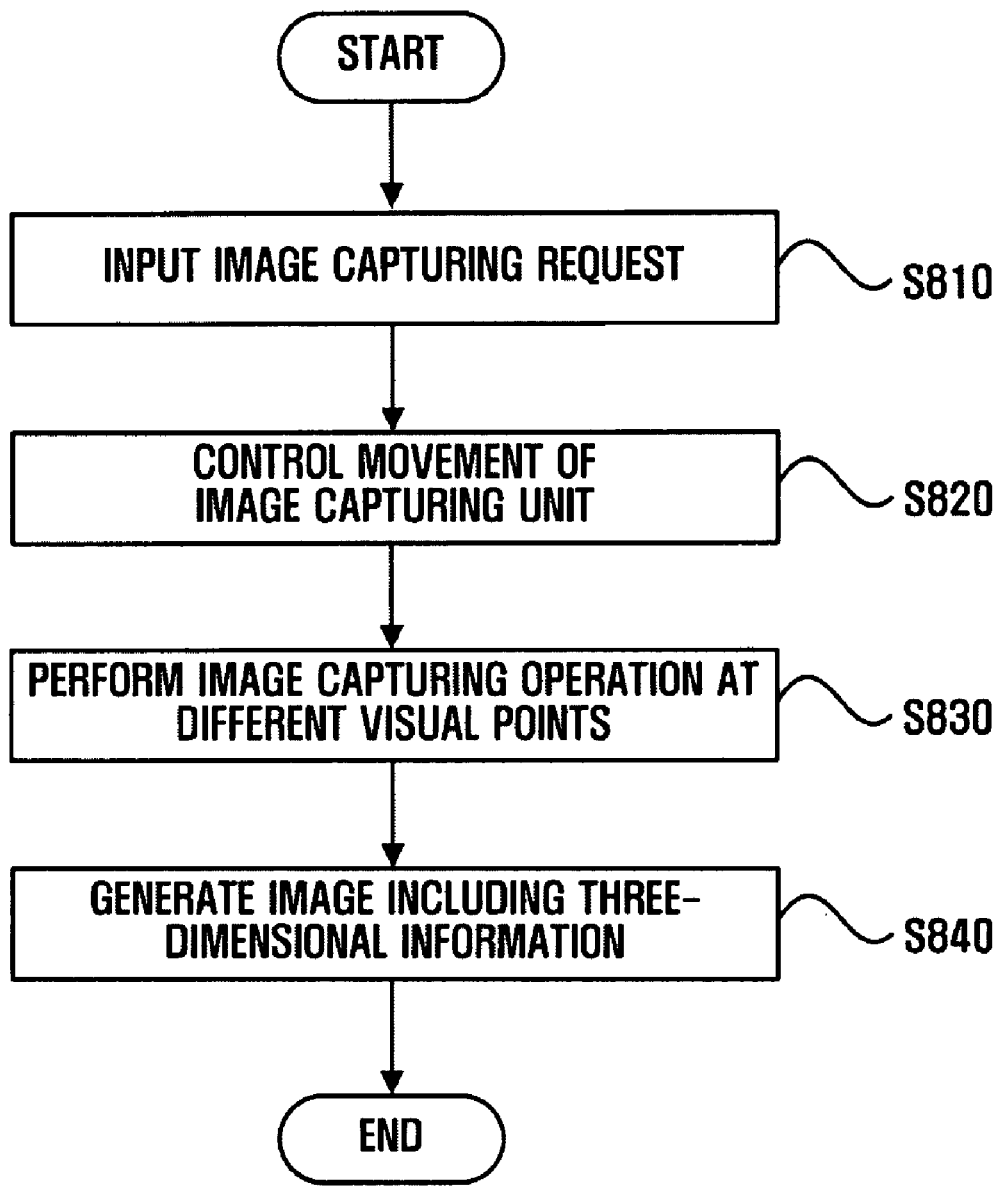

IMAGE PROCESSING METHOD AND APPARATUS

CROSS-REFERENCE TO RELATED APPLICATIONS

This application claims priority from Korean Patent Application No. 10-2007-0009597 filed on Jan. 30, 2007 in the Korean Intellectual Property Office, the disclosure of which is incorporated herein by reference in its entirety.

BACKGROUND

1. Field

One or more embodiments of the present invention relate to an image processing technology, and in particular, to an image processing method and apparatus that can extract depth information of an image.

2. Description of the Related Art

With the development of digital technology and the increase in multimedia data, users have requested dynamic and realistic entertainment environment. In order to meet this request, multi-channel sound systems and three-dimensional images have appeared.

According to the related art that provides the three-dimensional image, at least two cameras arranged in parallel with each other are used to acquire a plurality of images so as to provide the three-dimensional image using a difference among the acquired images.

However, according to the related art that uses at least two cameras, preliminary operations (for example, determining the positions of the cameras or the image capturing direction) for providing the three-dimensional image are needed and a plurality of cameras should be prepared. Therefore, the user has difficulty in using the related art system. Accordingly, there is a need for a convenient and low-cost technology that can generate the three-dimensional image.

SUMMARY

One or more embodiments of the present invention provide an imageprocessing method and apparatus that can extract depth information of an image using one image capturing device.

Additional aspects and/or advantages will be set forth in part in the description which follows and, in part, will be apparent from the description, or may be learned by practice of the invention.

To achieve at least the above and/or other aspects and advantages, embodiments of the present invention include an image processing method including generating a plurality of images from different visual points using a single image capturing unit, and extracting depth information using the plurality of images.

To achieve at least the above and/or other aspects and advantages, embodiments of the present invention include an image processing apparatus including, an image capturing unit generating a plurality of images at different visual points, and a three-dimensional image processing unit extracting depth information using the plurality of images.

To achieve at least the above and/or other aspects and advantages, embodiments of the present invention include an image capturing apparatus including, a main body in which a guide groove is formed, and an image capturing unit being coupled to the main body to move along the guide groove and generate an image.

BRIEF DESCRIPTION OF THE DRAWINGS

These and/or other aspects and advantages will become apparent and more readily appreciated from the following description of the embodiments, taken in conjunction with the accompanying drawings of which:

FIG. 8 illustrates the operation of an image processing apparatus, according to the embodiment of the present invention.

DETAILED DESCRIPTION OF EMBODIMENTS

Figure 1:
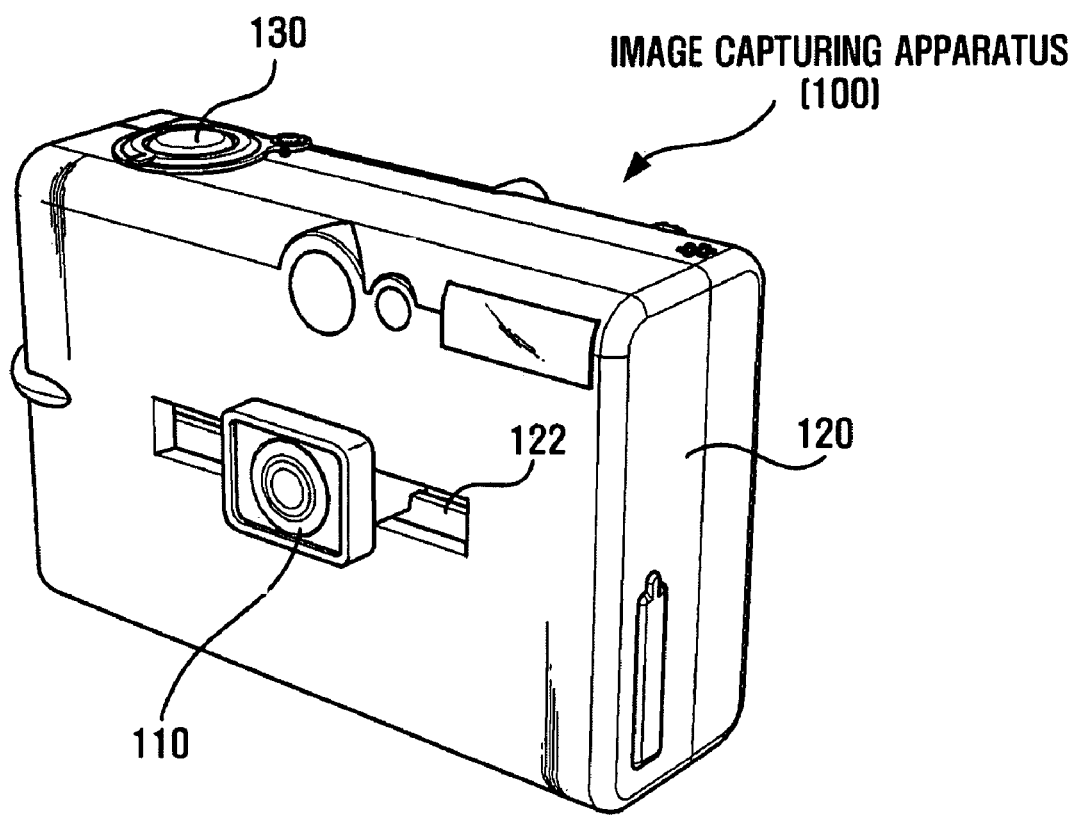
FIG. 1 illustrates an image capturing apparatus, according to an embodiment of the present invention.

Reference will now be made in detail to embodiments, examples of which are illustrated in the accompanying drawings, wherein like reference numerals refer to the like elements throughout. Embodiments are described below to explain the present invention by referring to the figures.

FIG. 1 illustrates an image capturing apparatus 100, according to an embodiment of the present invention. The image capturing apparatus 100 may include, for example, an image capturing unit 110, a main body 120, and a button 130. The image capturing apparatus 100 shown in FIG. 1 may be implemented by various digital apparatuses, such as a digital camera, a digital camcorder, a cell phone camera, or any device having an image capturing function.

The image capturing unit 110 may collect light and focus the collected light. Though not shown in the drawing, the image capturing unit 110 may include an optical system that has a lens and a diaphragm, and an image capturing element, such as a CCD (Charge Coupled Device) or a CMOS (Complementary Metal-Oxide Semiconductor).

The image capturing unit 110 may be movably connected to the main body 120. In an embodiment, the image capturing unit 110 is connected to the main body 120 such that it is movable in a horizontal direction with respect to the main body 120.

A guide groove 122 may be formed in the main body 120 to guide movement of the image capturing unit 110. The image capturing unit 110 may be connected to the main body 120 through the guide groove 122. In an embodiment, it is preferable that the guide groove 122 have a linear shape, although other shapes may also be used for the guide groove 122. When a linearly shaped groove is used, the image capturing unit 110 may linearly move along the guide groove 122.

Figure 2:
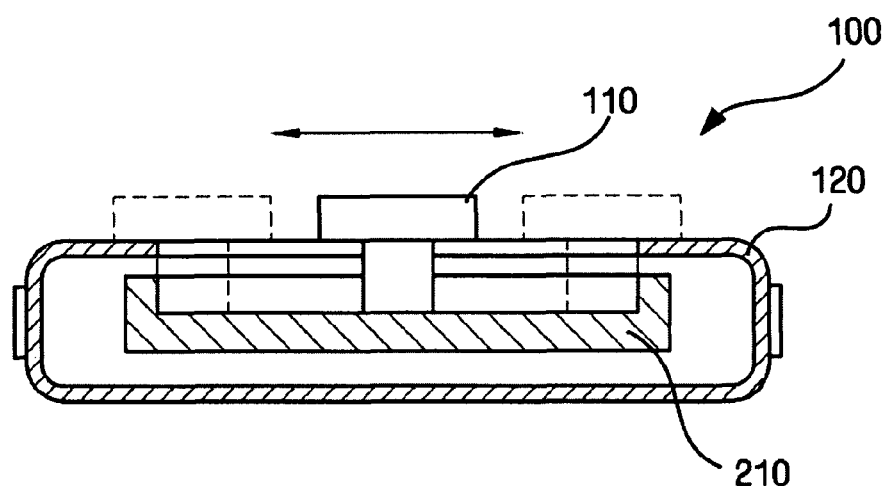
FIG. 2 is a cross-sectional view showing the image capturing apparatus, according to an embodiment of the present invention.

The image capturing apparatus 100 may further include a force provider 210 that moves the image capturing unit 110, as shown for example in FIG. 2. FIG. 2 is a cross-sectional view showing the main body 120 of the image capturing apparatus 100. As shown in FIG. 2, the force provider 210 may be included in the main body 120. In an embodiment, the force provider 210 may preferably be fixed inside the main body 120. The force provider 210 may be implemented using a servo motor, a piezoelectric motor, a solenoid, an actuator, or other driving units, but the present invention is not limited thereto. The force provider 210 may be implemented by any kind of force provider that can electromagnetically or mechanically supply power.

Figure 3:
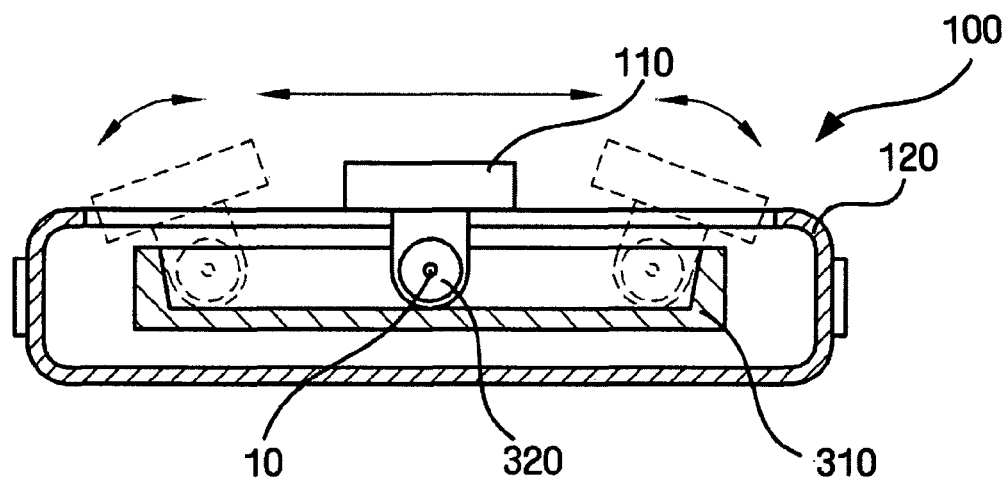
FIG. 3 is a cross-sectional view showing an image capturing apparatus, according to an embodiment of the present invention.

In FIG. 2, an image capturing apparatus 100 that includes image capturing unit 110 is illustrates as a linearly movable embodiment, but the present invention is not limited thereto. For example, the image capturing unit 110 may rotate as well as move linearly. FIG. 3 is a cross-sectional view showing the image capturing apparatus 100, according to an embodiment of the present invention. As shown in FIG. 3, the image capturing apparatus 100 may include, for example, a first force provider 310 and a second force provider 320.

The first force provider 310 may apply a force to the image capturing unit 110 such that the image capturing unit 110 may linearly move along the guide groove 122 formed in the main body 120. The first force provider 310 may be the same as the force provider 210 shown in FIG. 2, for example.

The second force provider 320 may apply a force to rotate the image capturing unit 110. Accordingly, the image capturing unit 110 may rotate around a predetermined reference axis 10.

The first force provider 310 and the second force provider 320 are typically interdependent. That is, a transition distance of the image capturing unit 110 by the first force provider 310 is usually in proportion to a rotation angle of the image capturing unit 110 by the second force provider 320. A ratio between the transition distance and the rotation angle may be set in various ways according to embodiments.

Meanwhile, in FIG. 3, when the image capturing unit 110 moves in a right direction, the rotational direction may assume a clockwise direction. Conversely, when the image capturing unit 110 moves in a left direction, the rotational direction may assume a counterclockwise direction. However, the present invention is not limited thereto. For example, the image capturing unit 110 may rotate in the counterclockwise direction while moving in the right direction or may rotate in the clockwise direction while moving in the left direction.

Furthermore, the image capturing apparatus 110 may include an image capturing button 130 that receives an image capturing request from a user or other components required for the image capturing operation.

Hereinafter, an image processing apparatus that processes images captured by the image capturing apparatus 100 will be described.

Figure 4:
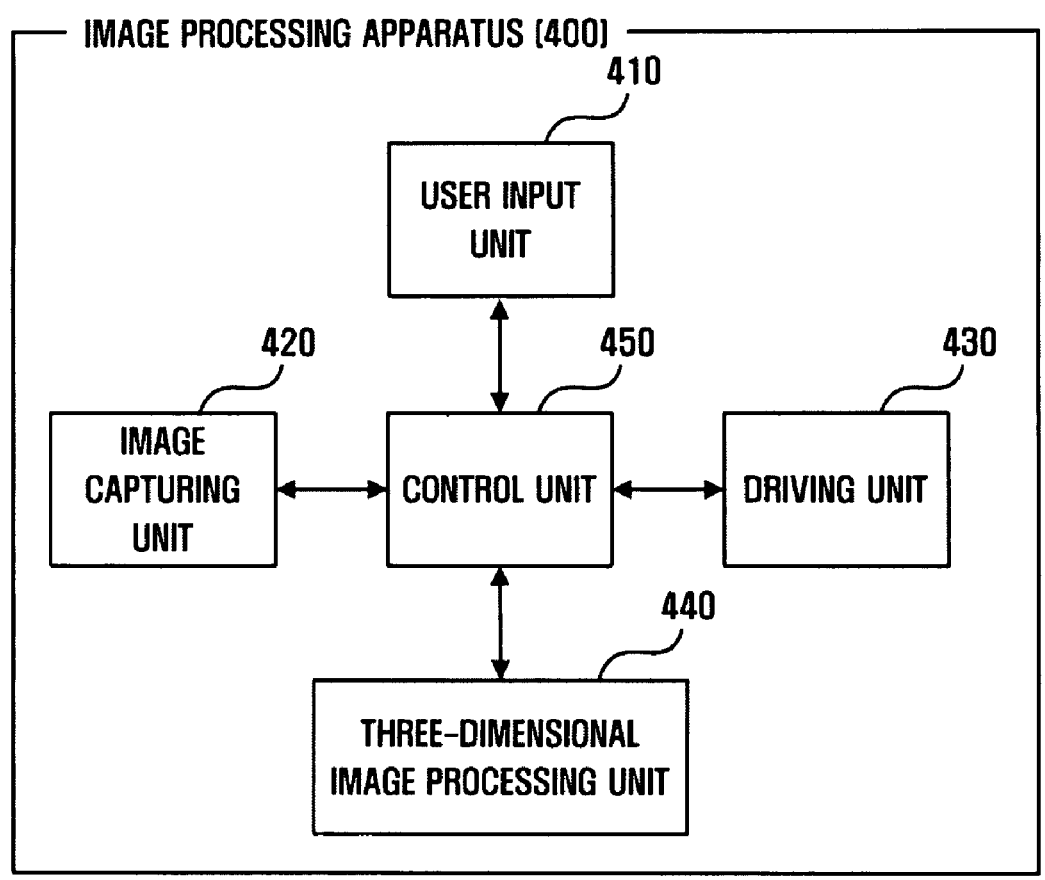
FIG. 4 illustrates an image processing apparatus, according to an embodiment of the present invention.

FIG. 4 illustrates an image processing apparatus 400, according to an embodiment of the present invention. As shown in FIG. 4, the image processing apparatus 400 may be included in the image capturing apparatus 100 shown in FIG. 1. The image processing apparatus 400 may include, for example, a user input unit 410, an image capturing unit 420, a driving unit 430, a three-dimensional image processing unit 440, and a control unit 450.

The user input unit 410 may receive a control request with respect to the image capturing apparatus 100 from a user. The user input unit 410 may include the image capturing button 130 shown in FIG. 1. In addition, the user input unit 410 may further include an input unit, such as at least one button, a touch pad, or a touch screen, for example.

The image capturing unit 420 corresponds to the image capturing unit 110 shown in FIG. 1. The image capturing unit 420 may perform the image capturing operation while being moved by the force provider 210 shown in FIG. 2 or the first force provider 310 and the second force provider 320 shown in FIG. 3. Of course, the image capturing unit 420 may temporarily stop, as necessary, to provide a clearer image at a visual point for image capturing. Accordingly, the image capturing unit 420 may provide a plurality of images captured from different visual points.

Figure 5A:
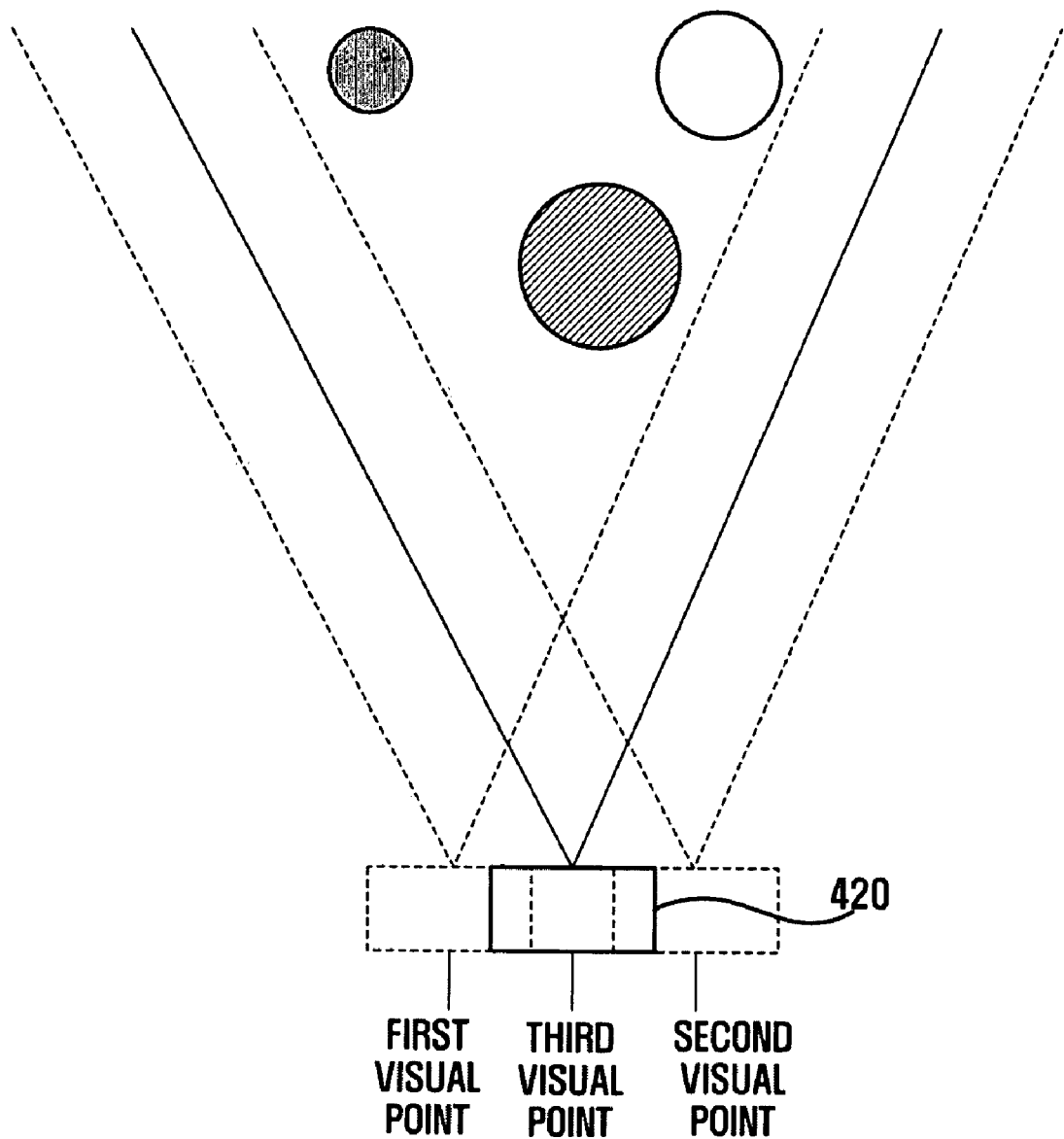
FIG. 5A illustrates the movement of an image capturing unit, according to the embodiment of the present invention.

FIG. 5A illustrates movement of the image capturing unit 420, according to the embodiment of the present invention. A third visual point may indicate a state where the image capturing unit 420 is located at the center of the guide groove 122. A first visual point and a second visual point may indicate states where the image capturing unit 420 horizontally moves from the third visual point, respectively.

Figure 5B:
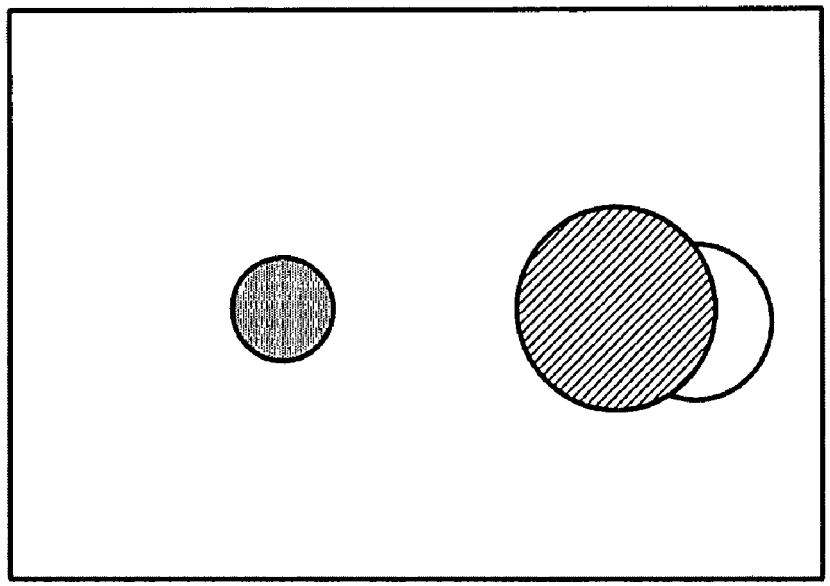
FIGS. 5B to 5D illustrate an image that is captured from each visual point shown in FIG. 5A.
Figure 5C:
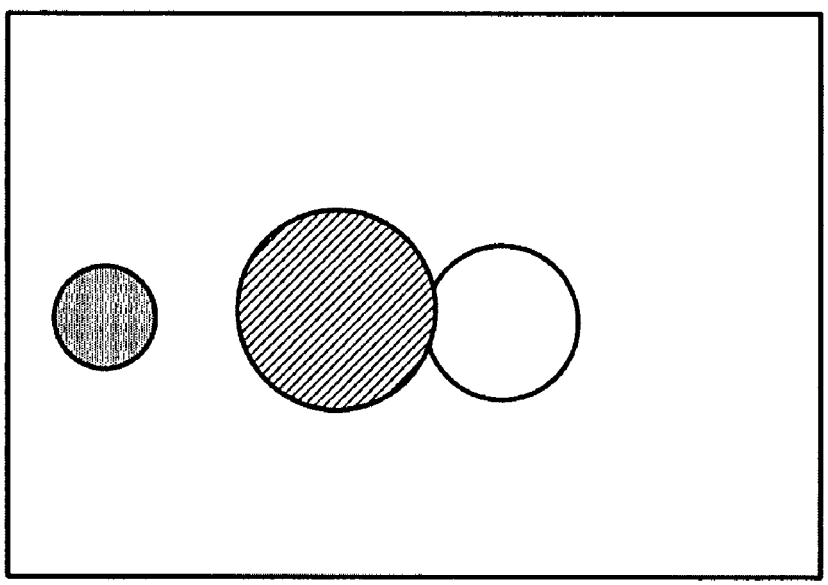
Figure 5D:
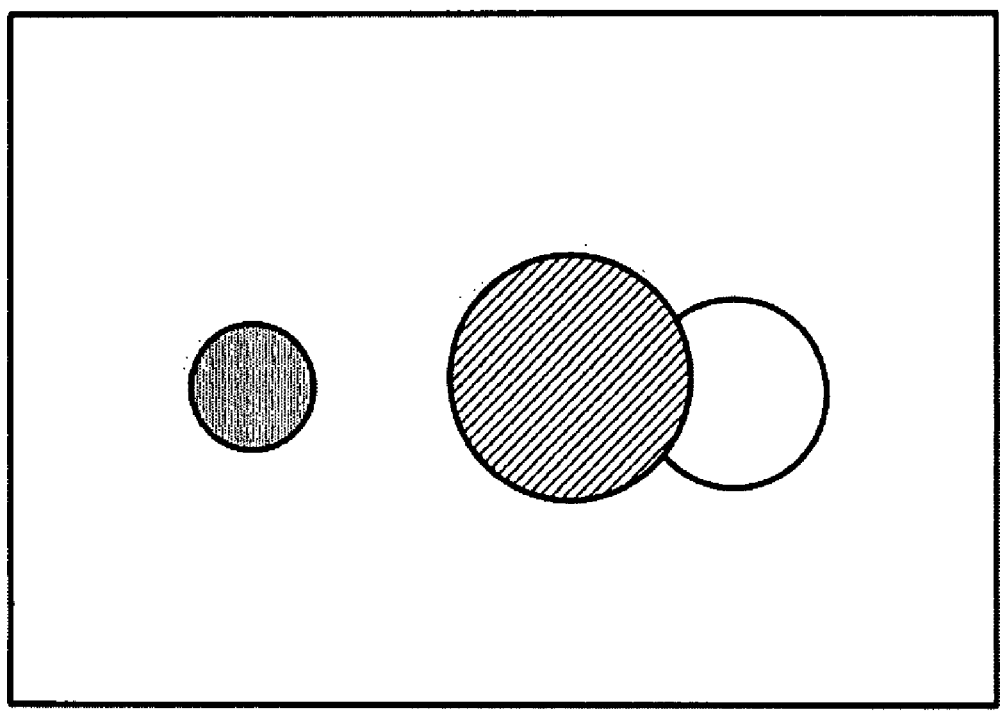

FIG. 5B shows an image (hereinafter, referred to as "left image") that is captured from the first visual point and FIG. 5C shows an image (hereinafter, referred to as "right image") that is captured from the second visual point. Further, FIG. 5D shows an image (hereinafter, referred to as "reference image") that is captured from the third visual point.

Returning to FIG. 4, the driving unit 430 may control the movement of the image capturing unit 420. In particular, the driving unit 430 may include, for example, the force provider 210 shown in FIG. 2 or the first force provider 310 and the second force provider 320 shown in FIG. 3. The driving unit 430 may cause the force provider 210 or the first force provider 310 and the second force provider 330 to apply an appropriate force to the image capturing unit 420. When the image capturing unit 420 performs the image capturing operation, the driving unit 430 may cause the image capturing unit 420 to temporarily stop. A position where the image capturing unit 420 performs the image capturing operation may be predetermined according to the number of images to be obtained or the physical structure of the image capturing apparatus 100.

Figure 6:
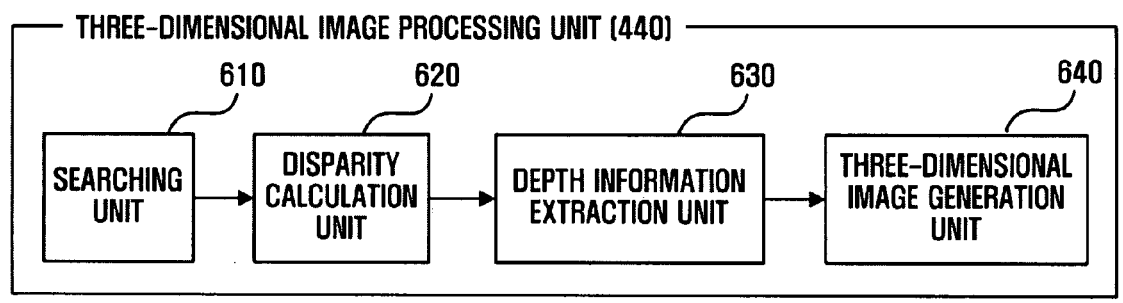
FIG. 6 illustrates a three-dimensional image processing unit, according to the embodiment of the present invention.

The three-dimensional image processing unit 440 may generate an image including three-dimensional information using a plurality of images captured by the image capturing unit 420. FIG. 6 illustrates the three-dimensional image processing unit 440, according to the embodiment of the present invention.

The three-dimensional image processing unit 440 may include, for example, a searching unit 610, a disparity calculation unit 620, a depth information extraction unit 630, and a three-dimensional image generation unit 640.

The searching unit 610 may search a point (hereinafter, referred to as "correspondence point") where a first image and a second image from the image capturing unit 420 correspond to each other. The first image and the second image are usually captured from different visual points. The left image and the right image shown in FIGS. 5B and 5C may be examples of the first image and the second image.

In order to search the correspondence point, a technique of searching a correspondence point on the basis of luminance of an image and a technique of searching a correspondence point on the basis of the structure may be described as examples.

The technique based on luminance may be used to search a point where intensities of light reflected from two images are similar. In particular, when the technique based on luminance is used, the searching unit 610 may select a concern pixel and adjacent pixels around the concern pixel from the first image. The selected pixels (concern pixel and adjacent pixels) become a sample window. Thereafter, the searching unit 610 may select a window, which is called a target window, having the same size as the sample window from the second image.

The target window may be selected from the entire second image. However, the target window may be selected from a region of the entire second image within a critical distance from the same coordinate of the second image as the coordinate of the sample window of the first image.

When the sample window and the target window are selected, the searching unit 610 may calculate a correlation between the sample window and the target window. The correlation may include information that indicates how much luminance of the sample window is similar to luminance of the target window. The searching unit 610 may calculate a difference in luminance between pixels of the sample window and the target window. As the sum of the absolute values of the luminance difference is small, the correlation between the two windows typically is high. A function for calculating the correlation is called a correlation function. There are various kinds of correlation functions and each may be applied to the present invention.

The searching unit 610 may select a plurality of target windows from the second image and calculate the correlation between the target window and the sample window. The searching unit 610 may determine that a center pixel of a target window having the highest correlation with respect to the sample window among the plurality of target windows as a pixel corresponding to the concern pixel of the first image. That is, the center pixel of the target window having the highest correlation with respect to the concern pixel of the first image may become a correspondence point between the first image and the second image.

Meanwhile, the technique based on the structure is used to extract a characteristic point to be easily discriminated from the first image and search a point most similar to the characteristic point from the second image. Here, the characteristic point may include corner points, highly curved points, and minor outline points of an object (subject) included in the first image. When the technique based on the structure is used, the searching unit 610 may select pixels of the characteristic point and around the characteristic point from the first image as the sample window and search a target window having the most similar characteristic to the sample window from the second image. It may be understood as an operation (a so-called block matching technique) of searching similar blocks between two frames so as to obtain a motion vector in a moving picture coding technique, such as MPEG2 (Moving Picture Experts Group 2).

The technique based on luminance of the image and the technique based on the structure of the image are just examples of embodiments of the present invention, and are not intended to limit the present invention. The searching unit 610 may use different types of correspondence point searching algorithms so as to search the correspondence point.

The disparity calculation unit 620 may calculate a difference (hereinafter, referred to as "disparity") between correspondence points of the images searched by the searching unit 610. The disparity may be calculated in pixels. There may be a plurality of pairs of correspondence points searched from the first image and the second image by the searching unit 610 and the disparity calculation unit 620 may calculate the disparity for each correspondence point.

The depth information extraction unit 630 may extract depth information using the disparity between the correspondence points. The depth information is generally necessary to construct a coordinate in a three-dimensional space corresponding to the coordinates (two-dimensional) in the first and second images. The depth information extraction unit 630 may measure a distance between the image capturing apparatus 100 and the subject in order to extract the depth information. An example will be described with reference to FIG. 7.

Figure 7:
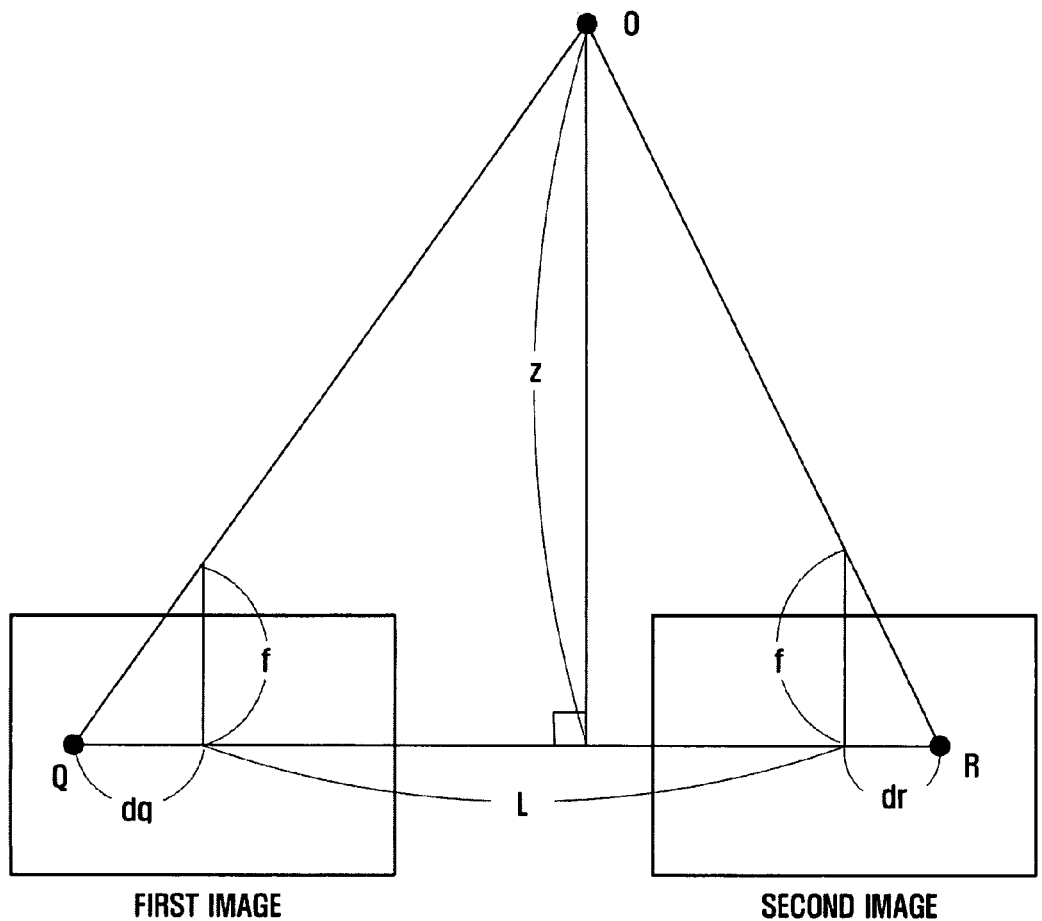
FIG. 7 illustrates measurement of a distance between an image capturing apparatus and a subject, according to an embodiment of the present invention.

FIG. 7 illustrates an example that calculates a distance z between the image capturing apparatus 100 (not shown in FIG. 7) and a subject O according to an embodiment of the present invention. A point Q of the first image and a point R of the second image indicate image capturing points of the subject O, and the points Q and R correspond to each other. In FIG. 7, reference symbol L indicates a distance between a position of the image capturing unit 420 when the first image is captured and a position of the image capturing unit 420 when the second image is captured. If it is assumed that a coordinate of the point Q in the horizontal direction is denoted by reference symbol dq on based on a center of the first image and a coordinate of the point R in the horizontal direction is denoted by a reference symbol dr based on a center of the second image, the distance z between the image capturing apparatus 100 and the subject O may be represented, for example, by Equation 1 below.

$$z = \frac{L \cdot f}{|dl - dr|} \qquad \text{Equation 1}$$

In Equation 1, reference symbol f denotes a focal distance and |dl−dr| denotes a disparity between the correspondence points Q and R. The calculated distance z may be used as the depth information through comparison with the distance values calculated for other correspondence points. Of course, the distance z calculated using Equation 1 generally needs to be scaled or standardized.

The extraction of the depth information from all the pixels in the image may require a high quantity of operations. Accordingly, the depth information extraction unit 630 may supply a depth information map that is continuous from discrete correspondence points using an interpolation technique.

The three-dimensional image generation unit 640 may generate a three-dimensional image using images supplied from the image capturing unit 420 and the depth information supplied from the depth information extraction unit 630. The images supplied from the image capturing unit 420 may be the first image and the second image or may be the reference image shown in FIG. 5D.

The three-dimensional image processing unit 440 described with reference to FIG. 6 is an embodiment of the present invention, but the present invention is not limited thereto.

Returning to FIG. 1, the control unit 450 may control the operations of the individual components constituting the image processing apparatus 400.

Each component of the image processing apparatus 400 described with reference to FIG. 1 may be implemented by a module. In an embodiment of the present invention, the term "module" represents software and hardware constituent elements such as a field programmable gate array (FPGA), or an application specific integrated circuit (ASIC). The module serves to perform some functions but is not limited to software or hardware. The module may reside in an addressable memory. Alternatively, the module may be provided to reproduce one or more processors. Therefore, examples of the module include elements such as software elements, object-oriented software elements, class elements, and task elements, processes, functions, attributes, procedures, subroutines, segments of program code, drivers, firmware, microcode, circuits, data, databases, data structures, tables, arrays, and parameters. The elements and the modules may be combined with other elements and modules or divided into additional elements and modules.

FIG. 8 illustrates an image processing method, according to an embodiment of the present invention. The image processing method is described with respect to operation of the image processing apparatus 400, according to embodiments of the present invention, although aspects of the invention may be accomplished through methods performed using a variety of systems.

When an image capturing request is received from a user, e.g., by the user input unit 410 in operation S810, the movement of the image capturing unit 420 may be controlled, e.g., by the driving unit 430 in operation S820. As an example of operation S820, the driving unit 430 may apply a control signal to the force provider 210 shown in FIG. 2 or the first force provider 310 and the second force provider 320 shown in FIG. 3, and the force provider 210 shown in FIG. 2 or the first force provider 310 and the second force provider 320 shown in FIG. 3 to cause the image capturing unit 420 to move or rotate accordance to the applied control signal. The transition distance or the rotation angle of the image capturing unit 420 may be different due to the structure of the image capturing apparatus 100 or the details of the three-dimensional image to be generated.

The image capturing unit 420 may move according to the control of the driving unit 430 and may perform the image capturing operation at different visual points in operation S830. As the result of operation S830, a plurality of images that are obtained by capturing the subject at different visual points may be provided.

Thereafter, an image including three-dimensional information may be generated, e.g., by the three-dimensional image processing unit 440, using the plurality of images supplied from the image capturing unit 420 in operation in S840. In operation S840, the correspondence points may be searched, the disparity between the correspondence points may be calculated, and the depth information may be extracted using the disparity. Then, the three-dimensional image may be generated using the depth information and the images supplied from the image capturing unit 420. The above-described procedure may be understood through an embodiment with respect to the three-dimensional image processing unit 440 shown in FIG. 6.

In addition to the above described embodiments, embodiments of the present invention may also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

As described above, the image processing method and apparatus according to one or more embodiments of the present invention may extract the depth information of the image using one image capturing apparatus having one image capturing unit.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An image processing method comprising:
    moving a single image capturing unit, which generates a plurality of images, in a direction substantially parallel to a focal plane of the image capturing unit along a guide groove formed in a main body;
    generating the plurality of images from different visual points using the single image capturing unit; and
    extracting depth information using the plurality of images.

2. The image processing method of claim 1, wherein the generating of the plurality of images includes:
    generating the images from different points when the image capturing unit is moving.

3. The image processing method of claim 2, further comprising:
    rotating the image capturing unit.

4. The image processing method of claim 3, wherein a transition distance of the image capturing unit is in proportion to a rotation angle of the image capturing unit.

5. The image processing method of claim 2, wherein the plurality of images are captured from different visual points while the image capturing unit linearly moves along the guide groove.

6. The image processing method of claim 1, wherein the extracting of the depth information includes:
    searching correspondence points between a first image and a second image among the plurality of images at different visual points;
    calculating a disparity between the correspondence points; and
    extracting the depth information of the correspondence points using the disparity.

7. At least one non-transitory medium comprising computer readable code to control at least one processing element to implement the method of claim 1.

8. An image processing apparatus comprising:
    an image capturing unit generating a plurality of images at different visual points, wherein the image capturing unit generates the images at different points while moving in a direction substantially parallel to a focal plane of the image capturing unit; and
    a three-dimensional image processing unit extracting depth information using the plurality of images.

9. The image processing apparatus of claim 8, further comprising:
    a driving unit controlling movement of the image capturing unit.

10. The image processing apparatus of claim 9, wherein the driving unit controls the rotation of the image capturing unit.

11. The image processing apparatus of claim 10, wherein a transition distance of the image capturing unit is in proportion to a rotation angle of the image capturing unit.

12. The image processing apparatus of claim 9, wherein the image capturing unit captures a plurality of images from different visual points while the driving unit causes the image capturing unit to linearly move along a guide groove formed in the image processing apparatus.

13. The image processing apparatus of claim 12, wherein the driving unit may cause the image capturing unit to temporarily stop while the image capturing unit captures an image.

14. The image processing apparatus of claim 8, wherein the three-dimensional image processing unit includes:
   a searching unit searching correspondence points between a first image and a second image among the plurality of images at different visual points;
   a disparity calculation unit calculating disparity between the correspondence points; and
   a depth information extraction unit extracting the depth information of the correspondence points using the disparity.

15. An image capturing apparatus comprising:
   a main body in which a guide groove is formed; and
   an image capturing unit being coupled to the main body to move in a direction substantially parallel to a focal plane of the image capturing unit along the guide groove and generate an image wherein the image capturing unit captures a plurality of images from different visual points while linearly moving along the guide groove.

16. The image capturing apparatus of claim 15, further comprising:
   a first force provider causing the image capturing unit to move along the guide groove.

17. The image capturing apparatus of claim 16, further comprising:
   a second force provider causing the image capturing unit to rotate around a predetermined reference axis.

18. The image capturing apparatus of claim 17, wherein a transition distance of the image capturing unit is in proportion to a rotation angle of the image capturing unit.

19. The image capturing apparatus of claim 16, wherein the first force provider may cause the image capturing unit to temporarily stop its linear movement along the guide groove while the image capturing unit captures an image.

* * * * *